United States Patent [19]

Messer

[11] Patent Number: 4,910,862
[45] Date of Patent: Mar. 27, 1990

[54] METHOD FOR PRODUCING A MAGNETIC TRANSDUCER INCLUDING A PLURALITY OF HEADS

[75] Inventor: Jean-Pierre Messer, Grosne, France

[73] Assignee: Bull S.A., Paris, France

[21] Appl. No.: 323,398

[22] Filed: Mar. 14, 1989

[30] Foreign Application Priority Data

Mar. 15, 1988 [FR] France .................. 88 03353

[51] Int. Cl.⁴ .............................................. G11B 5/42
[52] U.S. Cl. ........................................ 29/603; 29/856; 360/123
[58] Field of Search .................. 29/603, 856, 854, 855; 360/123, 124

[56] References Cited

U.S. PATENT DOCUMENTS 4,811,476 3/1989 Ranlin et al. ..................... 29/603

FOREIGN PATENT DOCUMENTS 0224403 6/1987 European Pat. Off. .
0277439 8/1988 European Pat. Off. .
8502479 6/1985 PCT Int'l Appl. .

Primary Examiner—Carl E. Hall
Attorney, Agent, or Firm—Kerkam, Stowell, Kondracki & Clarke

[57] ABSTRACT

A method for producing a magnetic transducer including a plurality of heads comprising placing p magnetic cores (such as 17-4), each provided with a winding (scuh as E4) extending over the entire length of the core, on a support plate (20), embedding these cores in an insulating layer (25), eliminating the spirals located at the ends of each core, and connecting the spirals (29, 30) located at the ends of the remaining windings to contact zones (52C, P1, P2, ... ).

13 Claims, 12 Drawing Sheets

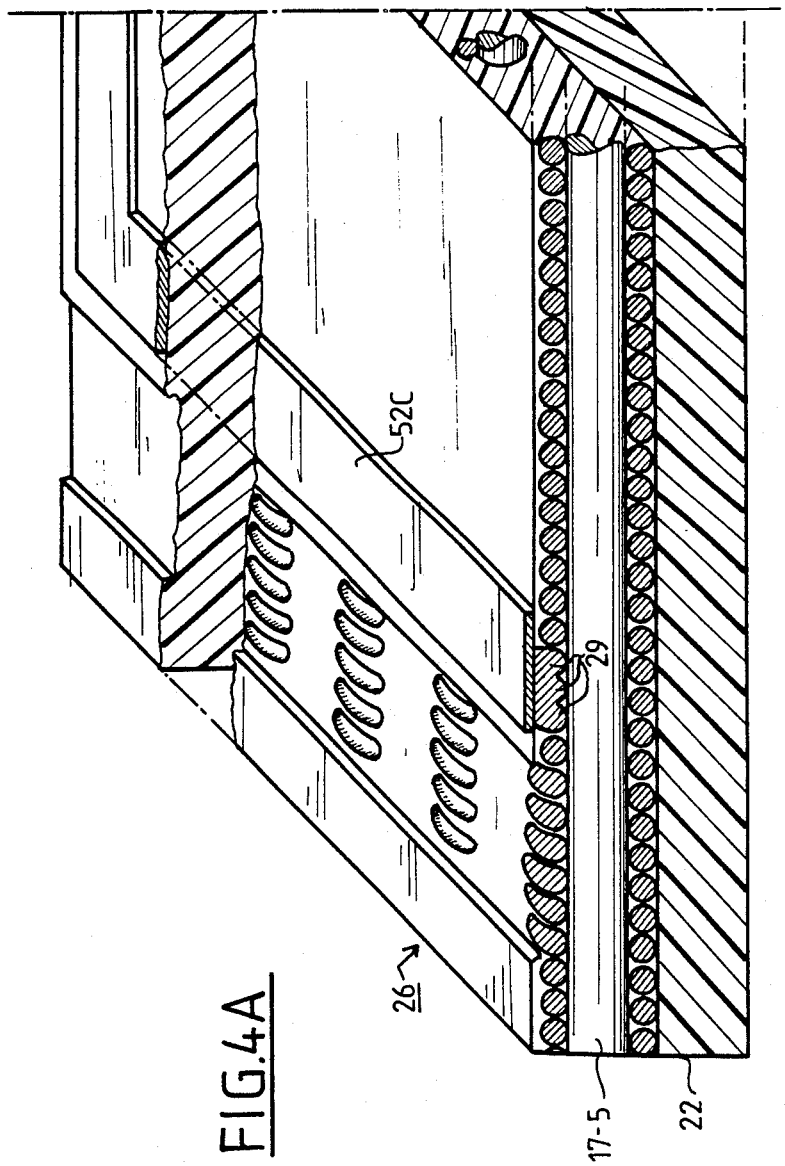

METHOD FOR PRODUCING A MAGNETIC TRANSDUCER INCLUDING A PLURALITY OF HEADS

FIELD OF THE INVENTION

The present invention relates to a method for producing a magnetic transducer that includes a plurality of heads. Such a transducer is used more particularly, but not exclusively, in magnetic non-impact printing machines.

Such printers, along with such equipment as magnetic drum memories or magnetic disk memories, are used for recording information and include a magnetic recording carrier that is present in various forms, for example in the form of a drum, and an endless belt or a disk; the carrier is coated with a layer of magnetic material. Recording of the information on the carrier is accomplished by means of a recording device known as a transducer, which includes one or more magnetic recording heads in proximity with which the recording carrier is displaced. Each of these heads, each time it is excited by an electric current of a suitable intensity, generates a magnetic field that has the effect of creating magnetized domains of small dimensions on the surface of the recording carrier that travels past the heads; these virtually punctuate domains are generally known as magnetized points. The portion of the carrier surface that thus passes before each head is typically known as an information recording track, and the recording carrier generally includes a plurality of tracks that can be subjected to the recording, either individually in the course of successive recording operations, or simultaneously in the course of a single operation.

To obtain better definition of the magnetized domains or points formed on the recording carrier, it has been proposed that the carrier be magnetized by the 'transverse' recording mode, that is, in such a manner that the magnetic induction presented by each domain, in each of the thus-formed magnetized domains, is practically perpendicular to the surface of the carrier. Such a magnetization mode proves particularly valuable in the case of magnetic printing machines, where in order to obtain a printed image with high resolution, a magnetic latent image the various constituent points of which are quite small and very close together must be recorded on the carrier. To record this latent magnetic image, the prior art has used a transducer including a plurality of magnetized heads disposed side by side and aligned in a direction perpendicular to the direction of displacement of the recording carrier. Each of these heads includes a thin magnetic core on which an excitation winding is wound; the core is substantially in the shape of a U and is profiled so as to have a relatively narrow recording pole at one of its ends and a flux closure pole of relatively large size on its other end, and these two poles are placed in contact with or in immediate proximity with the surface of the recording carrier. A transducer of this type has been described and shown particularly in U.S. Pat. No. 2,840,440.

These heads make it possible to obtain perfectly defined magnetized points on the recording carrier that are relatively small in size, for example having a square cross section on the surface of the carrier on the order of 100 to 200 microns on a side. However, they also have the disadvantage that each includes a core that must be machined with very high precision during manufacture, if the magnetized points formed by these various heads are to be substantially identical in size. Furthermore, these heads have the disadvantage that each includes a magnetic core the plane faces of which that face the plane faces of adjoining cores have a relatively large surface area, such that when the attempt is made to place these heads close to one another, in order to increase the density of magnetized points and hence improve the quality of the printed characters, the magnetic flux generated by the excited heads causes flux leakage, which as it circulates in the cores of adjacent heads to the excited heads causes the formation of undesirable magnetized points on the surface of the recording carrier.

These disadvantages can be overcome by making use of recording heads in which the magnetic core, provided with an excitation winding, takes the form of a rod or needle, the cores of these heads having one end disposed at least in immediate proximity with the surface of the recording carrier and these ends being aligned one after another along a direction perpendicular to the direction of displacement of the recording carrier. With these heads, which have a core that is easy to manufacture, the formation of undesirable magnetized points caused by magnetic flux leakage is notably reduced. Nevertheless, placement of these heads inside the same transducer has always been a difficult operation to perform, especially because of the small diameter of the cores and the poor rigidity that the cores have.

This is why in an embodiment described and shown in U.S. Pat. No. 3,890,623, in which the filamentary cores have a diameter in the vicinity of 0.8 mm, the aforementioned placement is obtained by initially piercing a first series of aligned holes in a first support plate, each hole having a diameter sufficient to permit the engagement with slight play of one of the two ends of a core, and then inserting each core, provided with its winding, into each of the holes, so as to keep it in place on this first support plate; by piercing second series of holes in a second support plate in such a manner that the holes are located vertically of the holes of the first series; and finally by effecting engagement of the other end of each core with the corresponding hole of the second series.

This kind of assembly, which can be performed in the case where the magnetic cores have a diameter equal to at least 0.5 mm, cannot be considered if the intent is to make a magnetic transducer the magnetic cores of the heads of which have a very small diameter, for instance less than 0.1 mm. This is because filamentary magnetic cores having such a slight diameter would not have sufficient mechanical rigidity to undergo the various assembly operations described above without being deformed.

OBJECT AND SUMMARY OF THE INVENTION

The present invention proposes a method that makes it possible to obtain a magnetic transducer including a plurality of heads with filamentary magnetic cores, even in the case where these cores have a very slight diameter, that is, less than 0.5 mm.

More precisely, the invention relates to a method for producing a magnetic transducer adapted for the recording and/or reading of information on a magnetic carrier, the transducer including at least one row of p magnetic heads, each of these magnetic heads comprising an elongated magnetic core provided with an excitation winding, the method comprising forming one winding of insulated conductor wire on each magnetic core, making at least one elementary block by disposing p cores, each provided with a winding, on a support plate having two opposed edges, in such a manner that these p cores are located side by side;

and coating the set of p cores with a layer of hardenable insulating substance;

this method being characterized in that it further attacking the surface of this layer, after hardening of this surface, such as to expose the upper portion of all the spirals of each winding, without modifying the cross section of these spirals to do so;

spreading a film of insulating resin on each layer, in such a manner as to cover the thus-exposed portions of the spirals, except for the upper portions of two first groups of spirals located respectively in the vicinity of each of the two ends of each winding;

and on said film of resin, forming contact zones connected to said first group of spirals, in such a manner as to permit the connection of said windings to an electrical control circuit.

In a particular characteristic feature of the method of the invention, in which each winding extends over the entire length of the core about which it is wound, this method further comprises:

effecting the spreading of the film of insulating resin such that on each winding, this film also does not cover the upper portions of two second groups of spirals, respectively located in proximity with each of the ends of this winding, between this end and the first group of spirals which is near this end, and eliminating said second groups of spirals on each winding.

Because of this elimination, the windings that are wound on the various cores are not threatened with coming into contact with the surface of the magnetic recording carrier when the ends of the cores are applied to this conductive surface, which prevents the situation, during recording of information on the carrier, in which some windings could become involuntarily excited by parasitic electrical currents circulating in the carrier. This elimination also prevents the situation in which as a consequence of machining operations performed (as described hereinafter) on the terminal portions of the magnetic cores, each of the two ends of each winding wound on each core might be put into electrical contact with the conductive material comprising the core, which would result in a short circuit of the winding wound on the core.

The invention also relates to a magnetic transducer made by this method.

The invention will be better understood and further objects and advantages thereof will become more apparent in the ensuing detailed description of exemplary but not limiting embodiments, in conjunction with the drawings.

BRIEF DESCRIPTION OF THE DRAWINGS

FIGS. 4A and 4B, when assembled together, show a detailed of a second arrangement of conductor tracks used to excite the windings of the transducer.

DESCRIPTION OF THE PREFERRED EMBODIMENTS

Figure 2:
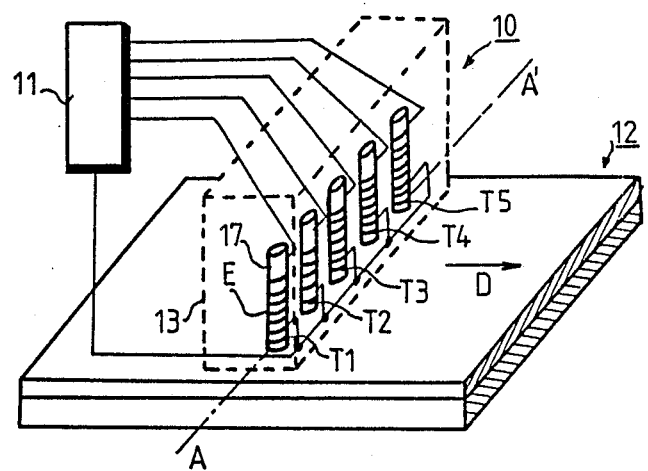
FIG. 2 is a schematic view showing the respective distribution of the magnetic heads with which a magnetic transducer capable of being produced by the method of the invention is equipped.

FIG. 2, in highly schematic fashion, shows a magnetic transducer 10 which upon receiving electrical signals representing data sent by a control unit 11 effects he recording of these data in the form of magnetized zones on a magnetic recording carrier 12. However, it should be noted that although this transducer is used here for recording signals, the same transducer can also be used to detect the presence of recorded magnetized zones on a magnetic recording carrier in order to convert them into electrical signals. Such a transducer, which makes it possible to record or read information on a magnetic carrier, typically includes a plurality of magnetic heads T1, T2, T3, and so forth, which as shown in FIG. 3 are assembled inside a support block 13; the set comprising these magnetic heads and the support block is typically called a module. These heads, which are of the type additionally described in U.S. Pat. Nos. 3,890,623 and 3,301,948, each include a magnetic core 17 in the form of a needle, made of a soft magnetic material such as the iron-silicon alloy containing approximately 4% silicon, for example, or an iron-nickel alloy known as "Anhyster"; this core is surrounded by a winding E which may be selectively excited by the electrical signals furnished by the control unit 11.

Thus as can be seen in FIG. 2, the cores of the various heads T1, T2, T3, and so forth are placed side by side, perpendicular to the surface of the recording carrier 12, and their lower ends are aligned in a direction AA', parallel to the surface of the carrier 12, which forms an angle other than zero with the direction of displacement D of the carrier. In the exemplary embodiment shown in FIG. 2, this direction AA' is perpendicular to the direction of displacement D.

Although for the sake of simplicity only five magnetic heads T1–T5 have been shown in FIG. 2, it will be understood that the number of magnetic heads of the transducer 10 may be different from that shown in the drawings. In the preferred exemplary embodiment to be described below, it is assumed that the transducer includes at least on row of 168 magnetic cores, aligned in the same direction AA'; each core has a diameter virtually equal to 66 $\mu$m, and the cores have a center-to-center spacing substantially equal to 212 $\mu$m. Under these conditions, by exciting the windings wound on these cores for a brief moment, virtually punctuate magnetized zones can be obtained on the recording carrier 12, these zones being spaced apart in a direction parallel to the direction AA'by a distance of 0.212 mm. However, as will be seen hereinafter, it is possible to obtain punctuate magnetized zones distributed at a closer spacing on the recording carrier 12, by providing, in addition to the row of magnetic heads aligned in the direction AA', at least one additional row of magnetic heads aligned in a direction parallel to the direction AA' in the transducer 10, but offset by a fraction of one spacing with respect to the magnetic heads of the first row.

In the embodiment shown in FIG. 2, the circuits 11 that control the excitation of the windings of the various heads T1, T2, and so forth are all accommodated outside the module 10. However, it should be noted that this embodiment is not the only possible one for the present invention; as will be seen hereinafter, some of these circuits may also be located inside the module.

Referring to Figs. 1A–1N, 1P and 1Q, the successive phases to be performed in the method according to the invention for obtaining a magnetic transducer of the type schematically shown in FIG. 2 will now be described. To be used, this method requires a number p of filamentary magnetic cores; in the example described, this number p=168. Each of these magnetic cores comprises a soft magnetic material an is provided with an excitation winding. Only three of these cores, identified by reference numerals 17-1, 17-2 and 17-3, have been shown In FIG. 1A. The windings carried by these cores have been represented respectively by reference numerals E1, E2 and E3 in this drawing figure.

The soft magnetic material which has been preferably selected to comprise each of these cores in the example described is an iron-nickel alloy produced industrially by the Societe Metallurgique d'Imphy under the name "Anhyster DS", which contains 50% nickel and 50% iron. Nevertheless, it should be noted that this material is not the only one usable in the invention and that each magnetic core 17 may be made of any other soft magnetic material. A particularly advantageous feature is that the magnetic cores provided with their windings are produced from the same very long wire of magnetic material, about which an insulated conductor wire has already been wound, by cutting this wire to length; the prior winding is done in continuous fashion by means of a reeling machine of a known type. The conductor wires used in the example described for making this winding is a wire of insulated copper, with a diameter equal to 40 $\mu$m.

Figure 1A:
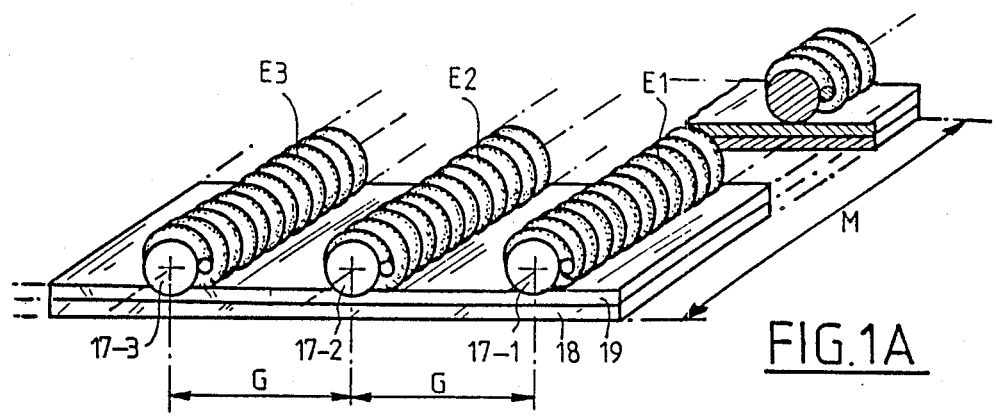
FIGS. 1A-1N, 1P and 1Q illustrate the various phases of employment of the production methods with which, according to the invention, a magnetic transducer can be obtained.

In the example described, it is assumed that this winding is performed in adjoining spirals, in a single layer, on a wire of magnetic material with a diameter equal to 66 $\mu$m. It is also assumed that the wire of magnetic material about which the insulated conductor wire has been wound is sufficiently long to make it possible, when it is cut to length, to obtain p portions of wire each having the same length M, each of these p portions comprising one magnetic core provided with its excitation winding; the winding thus extends over the entire length of the core. The magnetic cores 17-1, 17-2, . . . , 17-p and their respective windings E1 E2, . . . , Ep, which are obtained in this way are fixed, as shown by FIG. 1A, side by side on a metal sheet 18, the surface of which has previously been coated with a layer 19 of adhesive insulating material. It is assumed that in the example described this metal sheet 18, which is rectangular in shape, comprises a thin hoop of copper having a thickness on the order of 20 $\mu$m and a width M of approximately 5 mm.

Thus as seen in FIG. IA, the cores 17-1, 17-2, . . . , 17-p are disposed parallel to the width M of this sheet 18 and are spaced apart regularly; in the example described, the spacing G of the cores equals 212 $\mu$m. It will also be assumed that in the example described the sheet 18 has a length on the order of 35.5 mm, such that the maximum number of cores that can thus occupy space on this sheet equals 168. The fixation of the cores on the sheet is assured by the layer 9 of adhesive insulating material, which in the example described comprises a polymerizable resin, the polymerization of which is undertaken only once the magnetic core has been put in place on the sheet 18.

From the numerical values given above, it can be noted that the various constituent elements of the sets shown in the accompanying drawings have not all been drawn to scale, and that the dimensions of some of them have been intentionally exaggerated in the drawings for the sake of clarity.

Figure 1B:
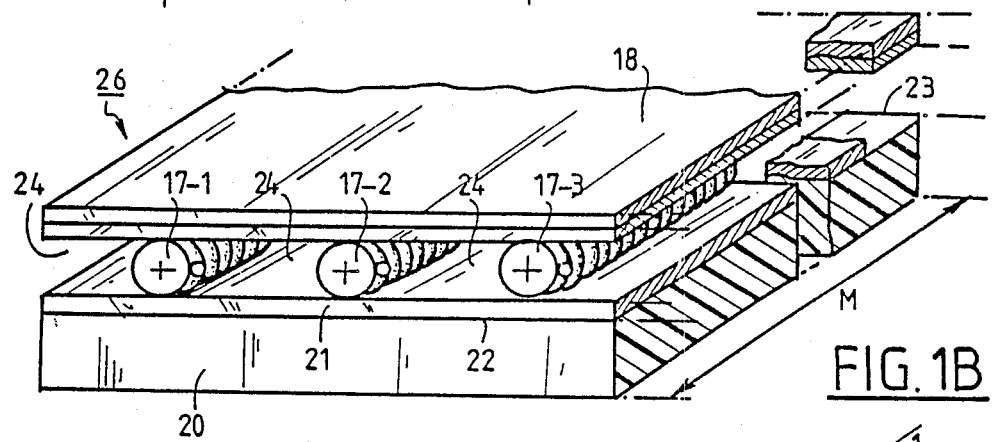
FIGS. 1X and 1Y show variant ways of executing certain phases of the method illustrated by FIGS. 1A-1M.

The set obtained when the fixation of the magnetic cores to the sheet 18 have been complted is then inverted and placed as shown in FIG. 1B on a support plate 20, the surface of which has previously been coated with a layer 21 of adhesive insulating material. Except for its thickness, this support plate 20, of parallelepiped form, as the same dimensions as the metal sheet 18. Thus as can be understood from FIG. 1B, the placement on the support plate 20 of the set comprising the sheet 18 and the magnetic cores glued onto the sheet is performed by first placing this set above the support plate 20, such that the magnetic cores are oriented perpendicular to the long edges 22 and 23 of the plate, and then by applying the set onto the plate so as to put the cores into contact with the layer 21 of adhesive insulating material. The fixation of the cores to the support plate 20 is assured under these conditions by this layer 21, which in the example described comprises a polymerizable resin, the polymerization of which is performed only once the set formed by the sheet 18 and the magnetic cores has been put in place on the support plate 20. Once this fixation is completed, a block 26 of parallelepiped form is obtained, which is shown in FIG. 1B, but in which voids 24 still remain. These voids are then filled with a molding resin introduced into these spaces by a known technique of impregnation in a vacuum. It is assumed that the molding resin used in the example described for this filling is an epoxy resin, manufactured industrially by Ciba-Geigy. Nevertheless, it should be noted that this type of molding resin is not specific to the present invention, and that any other type of suitable resin, such as an acetal resin, may also be used for this filling.

Figure 1C:
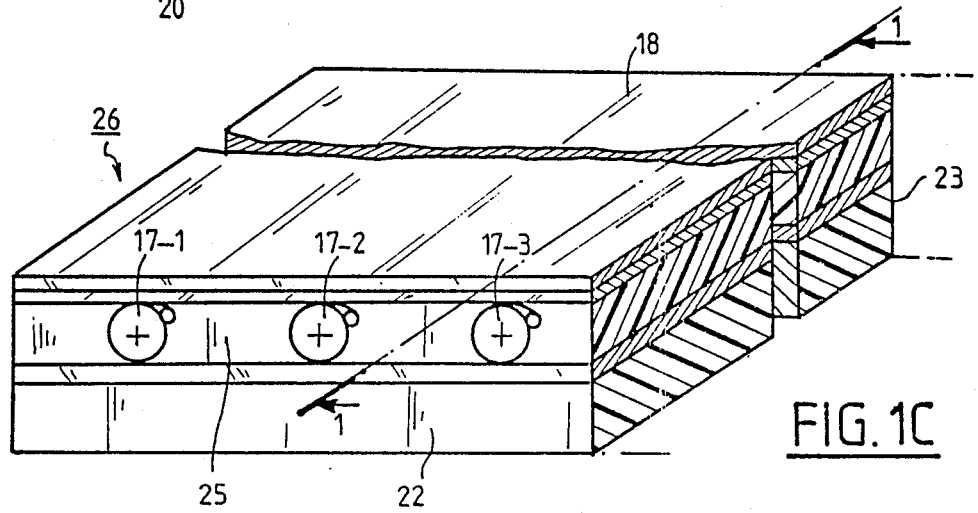

The block obtained when this resin has hardened is shown in FIG. 1C. The magnetic cores 17-1, 17-2, . . . , 17-p, which are interposed in the inside of this block between the sheet 18 and the support plate 20 are no embedded in a layer 25 of insulating resin, as are the windings E1, E2, . . . , Ep which are wound on the cores. As a consequence, only the ends of these cores appear at the opposite faces 22 and 23 of the block 26; these faces actually coincide with the long edges of the support plate 20.

It should now be noted that the layers 19 and 21 of adhesive insulating material, because of the physical role they play in the structure of the block 26, belong to the layer 25 of insulating resin. These layers 19 and 21 may also be made of the same resin as that comprising the layer 25. For this reason, in the text below, these three layers will not be distinguished from one another, and the set of these three layers will be described simply as a single layer, henceforth known as the resin layer 25.

It is also useful to note that in the example described, the support plate 20 is preferably made of a material that has a low coefficient of friction and a low coefficient of thermal expansion, such as a polyimide resin, in which graphite particles have been incorporated. Because of this, there is no risk that this support plate will heat up excessively or undergo major deformation when one of the faces of the support plate, as will be seen below, is pressed against the surface of a magnetic recording carrier driven for high-speed displacement.

Figure 1D:
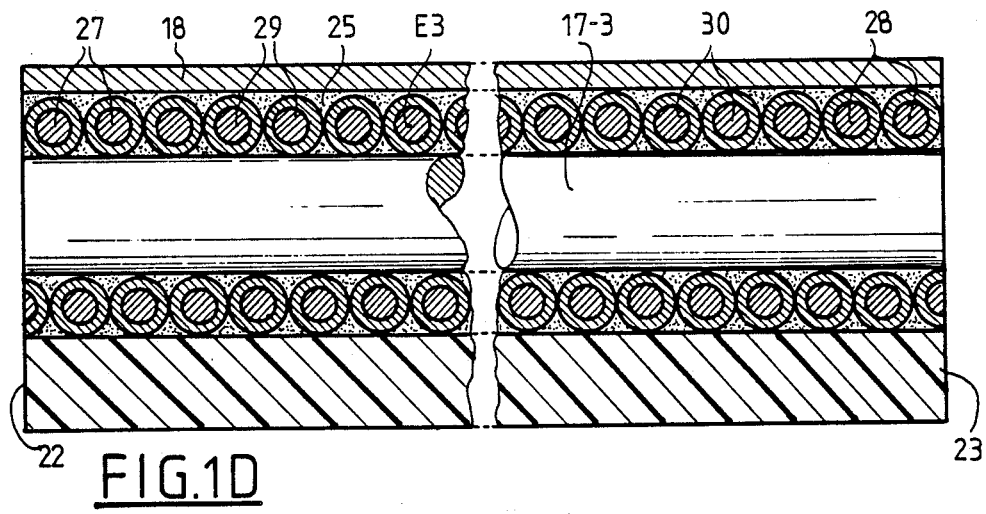

The operations that in the method of the invention permit the windings E1, E2, ..., Ep, which have now become inaccessible, to be connected to an electrical control circuit will now be described. For better understanding the detail of these operations, reference will be made to Figs. 1D-1N, 1P and 1Q, which illustrate the various operational phases performed; the phases illustrated by these figures, for evident reasons of simplification, have been shown for only one of the magnetic cores and for the winding carried by that core. FIG. 1D is a fragmentary sectional view of part of the block of 26, along a plane perpendicular to the surface of the sheet 18 and passing along a line 1—1 in FIG. 1C. In FIG. 1D, the magnetic core 17-3 is seen, the ends of which are located vertically of the faces 22 and 23 of the clock 26, and the winding E3, which is wound on this core. This winding E3 includes a plurality of spirals, certain of which, such as those indicated at 27 and 28, are located in proximity with the ends of the magnetic core 17-3; the spirals 27 thus comprise one group of spirals located in proximity with the face 22 of the block 26, while the spirals 28 comprise another group of spirals located in proximity with the face 23 of this block. In the example illustrated in FIG. 1D, each of these groups includes only two spirals, but it will be seen that in actuality, for reasons which will become apparent later, the number of spirals comprising the same group can be higher and can be selected equal to a fixed predetermined number, for example 6. These two groups 27 and 28 of spirals will hereinafter be known as second groups of spirals. Beside the group 27 of spirals is a group 29 of spirals, which may or may not be contiguous with the group 27 of spirals. Similarly, beside the group 28 of spirals there is a group 30 of spirals, which may or may not be contiguous with the group 28 of spirals. In the example shown in FIG. 1D each of the groups 29 and 30 includes only two spirals, but it will be understood that in actuality, for reasons which will be apparent later, the number of spirals of each of the groups 29 and 30 may be higher. These two groups 29 and 30 of spirals will hereinafter be called first groups of spirals.

Figure 1E:
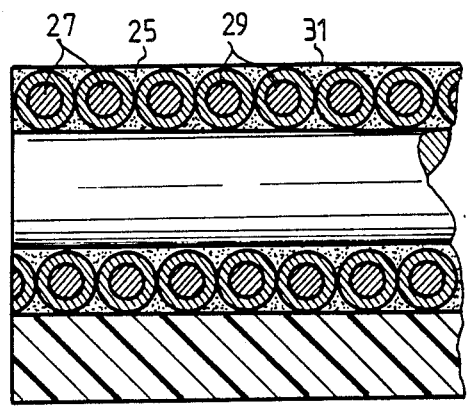
Figure 1F:
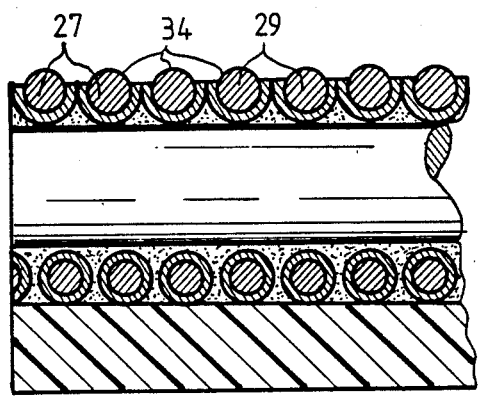
Figure 1G:
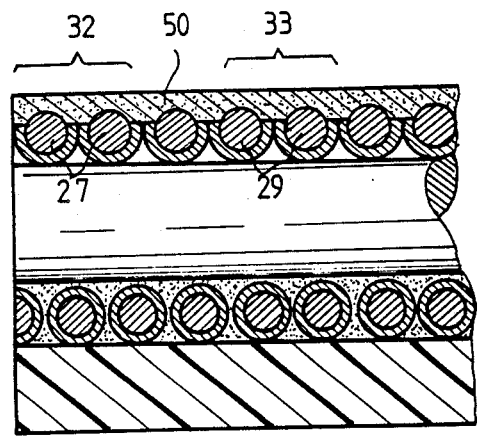

To enable connection of the windings E1, E2, ..., Ep to an electrical control circuit, the metal sheet 18 is first eliminated, as shown in FIG. 1E. This elimination, which can be performed by various known techniques, is accomplished in the example described by attacking the copper sheet 18 with the aid of a solution of iron perchloride, in a known manner, for a period of time that considering the thickness of the sheet is on the order of 100 seconds. After that, the block 26 is rinsed with water, and then after being dried is placed in an oxygen plasma etching apparatus, where its face 31 that was initially covered by the sheet 18 is subjected to an operation of reactive ionic etching. This operation, which is performed for 15 minutes, in a container that contains a gas, at a pressure reduced to several pascals, comprising approximately 90% by volume of oxygen with the remainder being sulfur hexafluoride or neon hexafluoride, has the effect that, as FIG. 1F shows, part of the resin layer 25 is eliminated, as is the insulating enamel that covers the upper portions 34 of the spirals, such that these upper portions are now exposed. Once this reactive ionic etching operation is completed, the block 26 is subjected to an ultrasonic cleaning operation. After that, a film 50 of insulating resin is deposited on the face of the block 26 on which the exposed portions of the spirals appear, in such a way that this film completely covers the exposed portions, as FIG. 1G shows. The resin preferably used, in the example described, for this film 50 is a polyimide resin industrially manufactured by DuPont de Nemours, and known by the tradename "PYRLLIN PI".

Figure 1H:
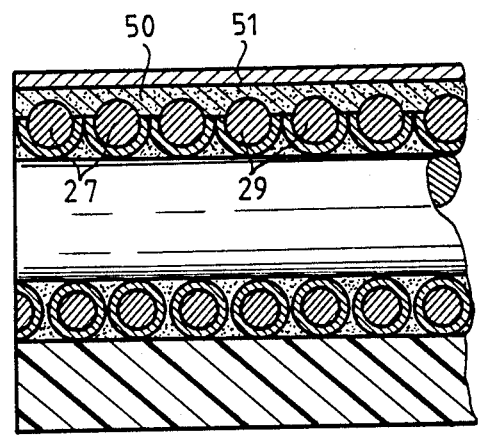
Figure 1I:
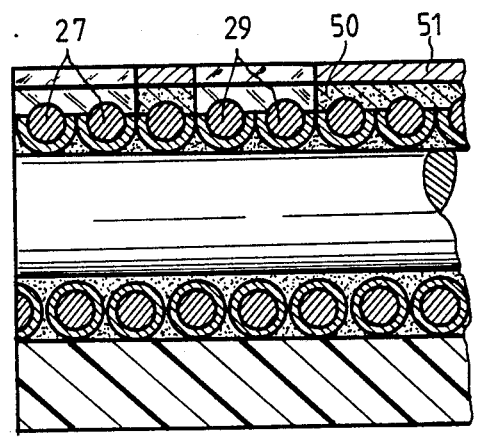

To spread this polyimide resin on the block 26, a plate whirler is used, substantially comprising a horizontal circular plate driven by an electric motor of which the speed can be varied by varying the supply voltage. The supply voltage is adjusted so as to obtain a film 50 of polyimide resin of which the thickness is substantially between 5 and 6 $\mu$m. Once this spreading operation is completed, the resin is subjected to precuring for 30 minutes at a temperature on the order of 120° C., which causes partial imidization of the resin. Next, as FIG. 1H shows, a layer 51 of photoresist is deposited on the resin film 50. After pre-curing and insulation by a mask, the film of resist is developed; the mask and the type of resist used are arrived at in such a manner that at the end of these operations, the film of resist is eliminated from regions 32 and 33 of the surface of the film 50, which as can be seen in FIG. 1G are located facing the second and first groups of spirals of each winding, respectively. However, the resin comprising the film 50, because it has undergone only partial polymerization, has the property of also being attacked by the chemical agent that is used for the development of the photoresist. Under these conditions, when the photoresist layer 51 has been eliminated from the regions 32 and 33 by this agent, the film 50, which is now exposed in these regions, is attacked in turn, so that by definition the upper portions of the first and second groups of spirals are exposed, as FIG. 1I shows.

Figure 1J:
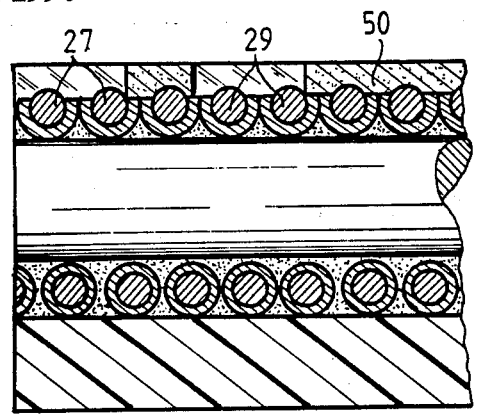

As FIG. 1J shows, the remaining portions of the photoresist film are now removed. This removal is performed by first placing the block 26 on a plate whirler, in such a way that the remaining photoresist layer is in a horizontal position, and then driving the plate whirler to rotate, while pouring acetone little by little onto the photoresist layer. This operation is continued until the photoresist layer is eliminated completely from the surface of the resin film 50. After that, the remaining portions of the film 50 are subjected to curing, at a temperature that permits the complete polymerization of the resin comprising this film. This is followed for 30 seconds by a known operation of high-pressure corona discharge, the objective of which is to completely clean the remaining film 50, as well as the exposed portions of the first and second groups of spirals.

Figure 1K:
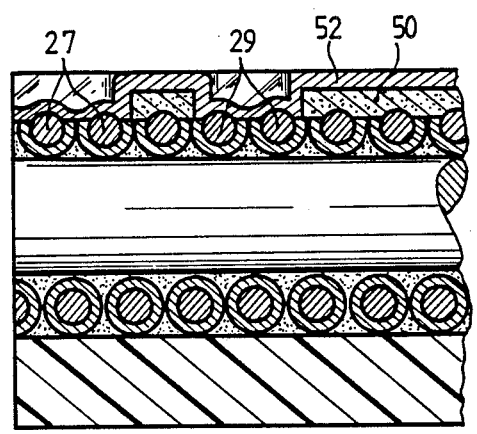
Figure 1L:
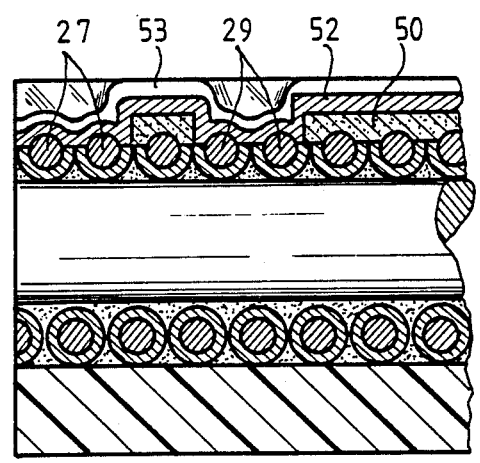
Figure 1M:
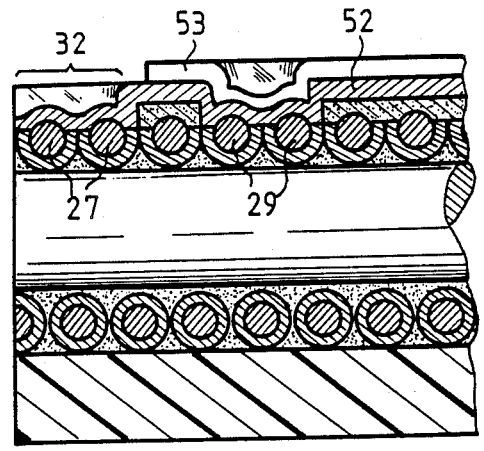
Figure 5:
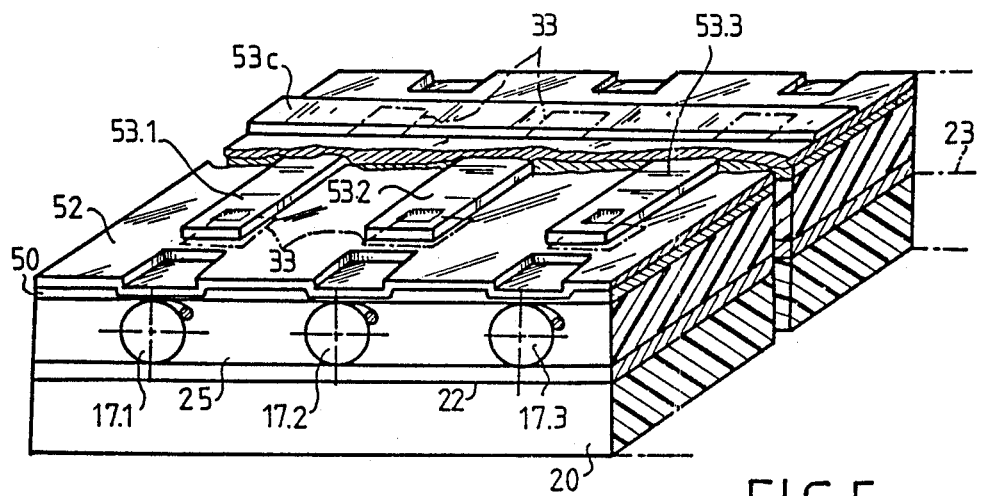
FIG. 5 is a perspective view, intended to show in more detailed fashion one of the operation phases performed when the method illustrated in FIG. 1A-1N, 1P and 1Q is performed.

Once this operation is completed, a layer 52 of conductive metal is deposited on the remaining film 5 and on the regions where the spirals have been exposed, as FIG. 1K shows. In the example described, this layer 52 comprises copper and is preferably deposited by a known method of vacuum sputtering. Although the thickness of this layer 52 is very slight, on the order of 5 to 10 $\mu$m, it will be understood that all the spirals comprising the first and second groups of spirals are connected to one another via this conductive layer 52. Next, as FIG. 1L shows, a film 53 of photoresist is deposited on the conductive layer 52. The role of this film 53 is to permit the metal layer 52 to be etched, in a predetermined configuration to be defined below, so as to form a series of contact zones and conductor tracks on the block 26 that are intended to assure the necessary electrical connections for the excitation of the various windings. After pre-curing and insulation by a mask, this photoresist film is developed; the mask and the type of resist used are selected such that at the ends of these operations, the photoresist film 53 is partially eliminated from the surface of the metal layer 52, as FIG. 1M shows, and that the remaining portions of this film of photoresist, as FIG. 5 show, form a strip of resist 53C on this surface which extends parallel to the edge 23 of the support plate 20 and passes at least vertically of the regions 33 under which the first groups of spirals 30 are located, and also forms p strips of resist 53-1, 53-2, . . . , 53-p, which are equal in number to the magnetic cores 17-1, 17-2, . . . , 17-p; these p strips cover the portions of the layer 52 that are located vertically of the regions 33 under which the first groups of spirals 29 are located, and each of these p strips extends in a direction perpendicular to the lengthwise direction of the strip 53C. The configuration of these photoresist strips will be described hereinafter and is selected such that etching of the metal layer 52 creates on the one hand contact zones sufficiently large to allow easy performance of the operations of connecting the windings to an electrical control circuit and on the other hand conductor tracks assuring the necessary connections between these contact zones and the first groups of spirals 29 and 30 which are located in the vicinity of the ends of these windings.

Figure 1N:
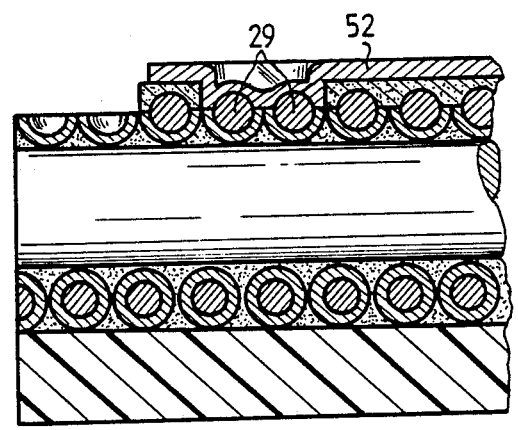

When the development of the photoresist film 53 is complete, the metal film 52 is subjected to an etching operation. In the example described, this operation is performed by attacking the copper film 52 with a solution of iron perchloride, for a period of time on the order of 30 seconds to one minute. Thus as can be seen by referring to FIGS. 5 and 1M, the effect of this operation is to eliminate all the portions of the layer 52 that are not protected by the photoresist 53. Moreover, when the portions of the metal film 52 that cover the regions 32 have been removed, the second groups of spirals 27 and 28 that are located beneath these regions 32 are attacked in turn. As a consequence, once this etching operation is completed, these second groups of spirals are virtually eliminated, or at least, as FIG. 1N shows, are reduced to the state of metal fragments that are electrically insulated from one another and are no longer in contact with the other spirals of the windings to which these groups initially belonged. Under these conditions, when the strips of resist 53C, 53-1, 53-2, . . . , 53-p are removed, then, as FIGS. 3A and 3B taken together show, a block 26 is obtained which, on its face that underwent the etching operation, is provided on the one hand with conductor tracks 52C, 52-1, 52-2, . . . , 52-p and other hand with p contact zones P1, P2, P3, and so forth. These conductor tracks and contact zones thus result from the etching of the metal film 52. The mask used for this operation is selected, as noted above, such that after etching, the remaining portions of this layer have the configuration shown in FIGS. 3A and 3B.

Figure 1P:
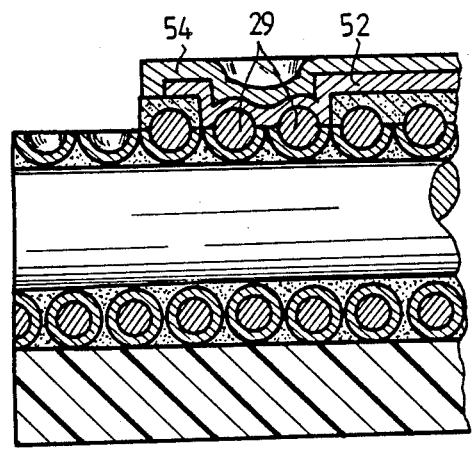
Figure 3A:
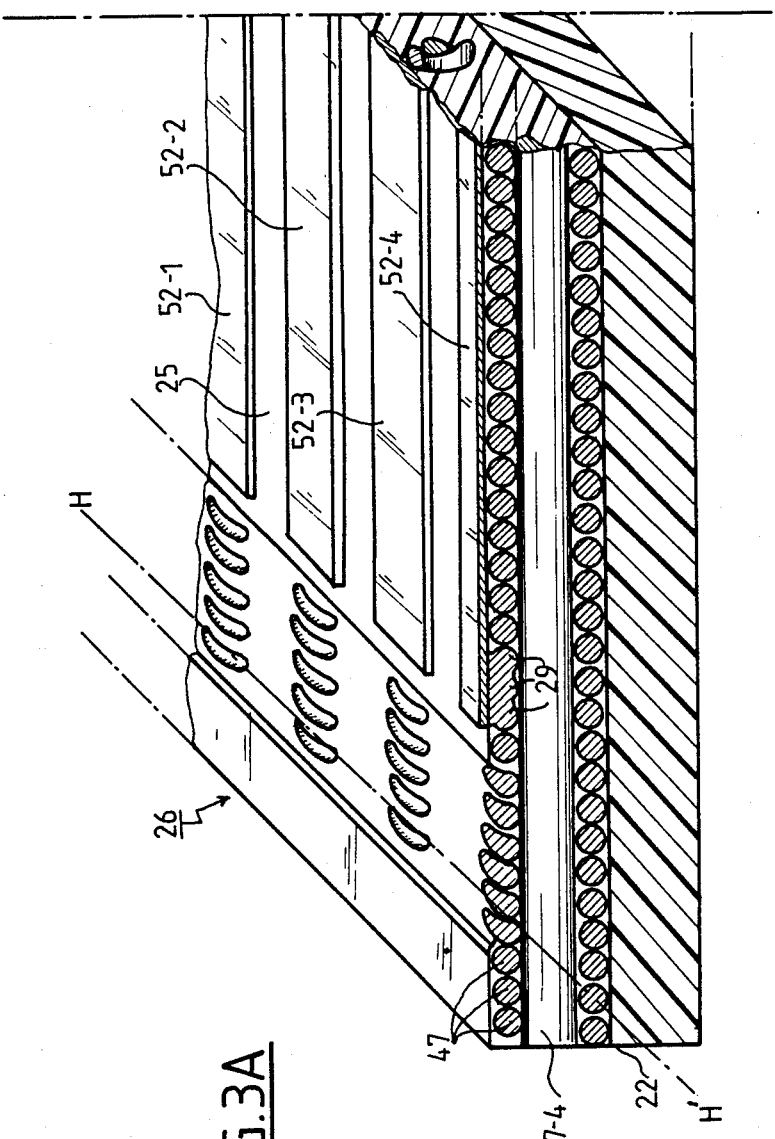
FIGS. 3A and 3B, when put together, form a detailed view showing a first arrangement of conductor tracks serving to excite the windings of the transducer.
Figure 3B:
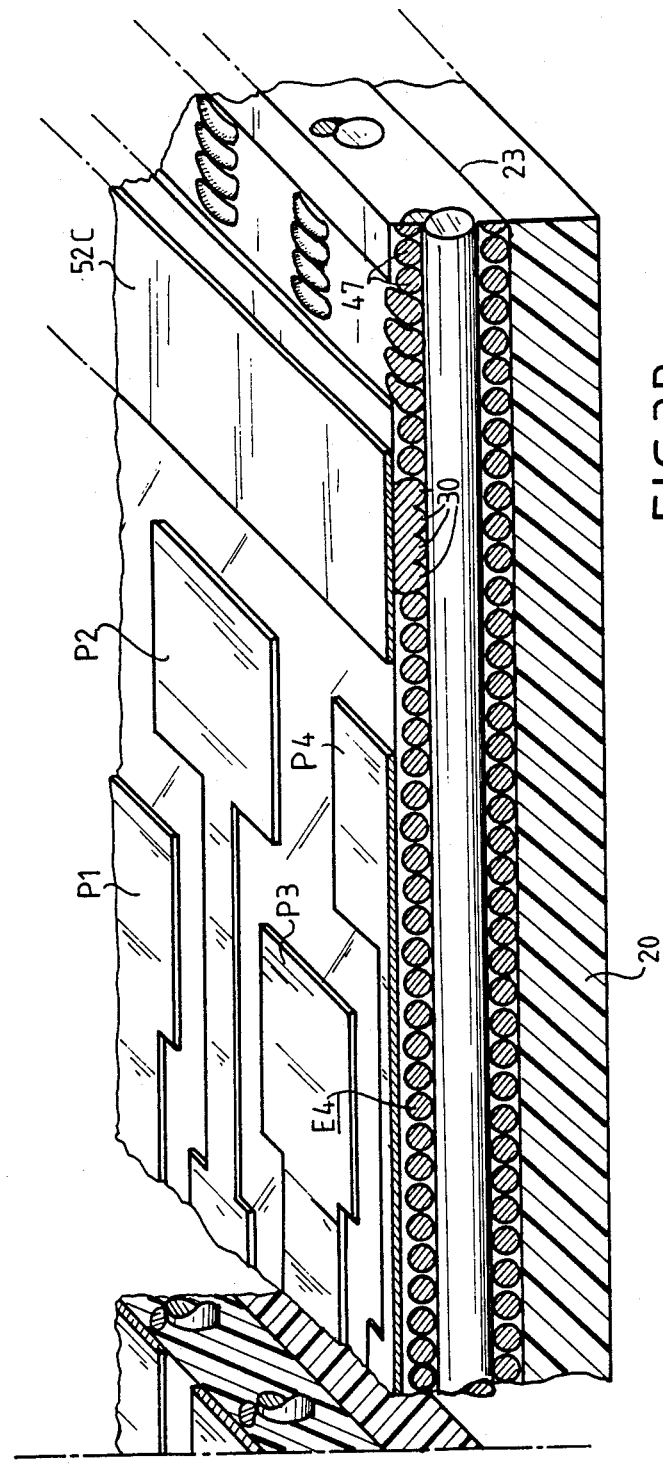

In the configuration illustrated by FIGS. 3A and 3B taken together, the first groups of spirals 30 of the windings E1, E2, . . . , Ep are all connected to one another via the conductor track 52C, while the p contact zones P1, P2, P3, and so forth, which are equal in number to the windings E1, E2, . . . , Ep, are each connected respectively, via one of the corresponding p conductor tracks, to the first groups of spirals 29 of each of these p windings. As will be seen below, the conductor track 52C and the p contact zones P1, P2, P3 and so forth are thus intended to be connected to a control circuit provided for the selective control of the excitation of the various heads. However, before this connection is made, a metal film 54 is deposited as shown in FIG. 1P on the contact zones and on the conductor tracks 52C, 52-1, 52-2, and so forth. This film 54 has the role of facilitating the soldering operations performed later for assuring this connection, on the one hand, and on the other of protecting the zones and conductor tracks from the corrosive action of the oxygen, moisture, and various acidic substances in the atmosphere. In the example described, this film 54 is in actuality a double film and comprises a film of nickel several microns in thickness, coated with a very fine film of gold of at least 1 $\mu$m in thickness; these two films are deposited electrolytically.

It should now be noted that the face 22 of the block 26, as will be seen below, is intended to come into contact with the surface of a magnetic recording carrier. To prevent the risk that this face 22 will cause deterioration of the surface of the recording carrier when the recording carrier is moved for displacement, the face 22 is subjected to a precision grindinq operation, the purpose of which is to provide this face with a suitable surface state that facilitates its sliding over the surface of the recording carrier.

Moreover, it may happen that as FIGS. 3A and 3B show, the spirals that belong to the second groups of spirals and have been eliminated are located at a very short distance, but not zero, from the faces 22 and 23 of the block 26. In this case, after the second groups of spirals have been eliminated, some spirals still remain in the intervals between these faces and the regions in which the second groups of spirals are located; these remaining spirals, such as those shown at reference numeral 47 in FIGS. 3A and 3B, remain intact. These spirals 47, which have no role whatever in the functioning of the heads, can easily be eliminated by slicing the block 26 along two planes parallel to the faces 22 and 23; these planes, each located respectively in the vicinity of each of the two faces, pass via the regions where the spirals of the second groups are located. Once of these two planes has been represented symbolically in FIG. 3A by a dot-dash line HH'. The new faces of the block 26 resulting from the slicing operation are then subjected to the aforementioned precision grinding operation.

After all these operations, a block 26 is then obtained, as seen in FIGS. 3A and 3B taken together, in which the various windings wound onto the magnetic cores each comprise spirals that have remained intact and are included between the two first groups of spirals 29 and 30 of each winding, and in which because of the elimination of tee second groups of spirals, each magnetic core has, at its ends, two portions of its length from which spirals have been completely removed. Since the precision ground face 22 of the block is intended to be put into contact with the surface of a magnetic recording carrier, this arrangement provides that the windings wound on these cores are not in contact with this surface and hence are not deteriorated by it when it is moved for displacement. This arrangement also prevents involuntary excitation of some windings by parasitic electrical currents circulating in the recording carrier when information is recorded on this magnetic recording carrier.

To assure that the risk of deterioration of the windings by the recording carrier does not arise, because of the reduction in length of the cores from wear and from prolonged use of the transducer, it is preferable that the number of spirals belonging to each second group of spirals not be too low. This is why, in the example described, this number is equal to at least 4. Moreover, since the excitation of each wound winding, for example the winding Ei is obtained by causing electrical current to circulate in the portion of the circuit comprising the contact zone P-i, the conductor track 52-i, the winding Ei and the conductor track 52C, it is important that the number of spirals comprising each of the first groups of spirals 29 and 30 be sufficiently high that the electrical resistance of the connections assured by these groups of spirals does not limit the intensity of the currents circulating in each portion of the circuit to a value less than that necessary for proper functioning of the heads. In the example described, where the spirals have a diameter of 40 $\mu$m and are wound on a magnetic core having a diameter of 66 $\mu$m, it has been found that the number of spirals comprising each of the first groups of spirals must be equal to at least 2.

Figure 1Q:
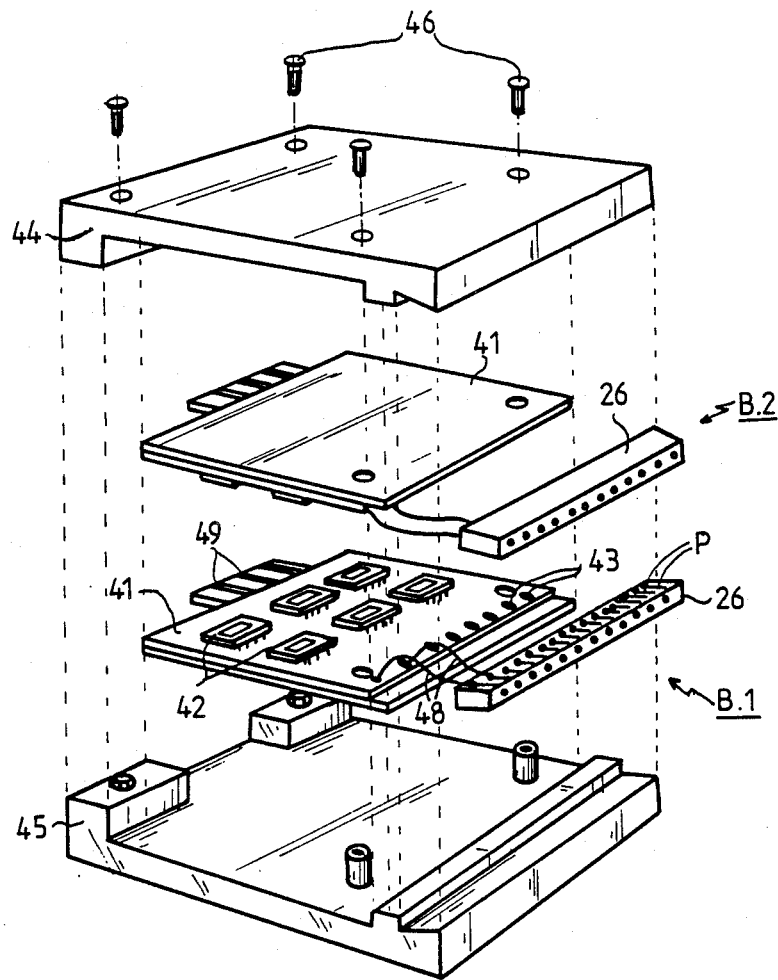

The block 26 that is obtained once the aforementioned operations have been completed is then, as FIG. 1Q shows, juxtaposed with a wiring board 41, typically known as a substrate; this board is provided with a logical control assembly comprising electronic components 42. This logical control assembly is part of the control unit 11 referred to above. The wiring board 41 is in the form of a rigid rectangular plate of insulating material, which in a known manner is provided with a printed electrical circuit (not shown) that assures the indispensible connections among the various electronic components 42 mounted on the board, and between these components and contact zones 43 with which this board is provided on one of its edges.

The number of contact zones 43 on the board 41 equals p+1, where p is the number of contact zones P1, P2, P3, and so forth of the block 26; in FIG. 1Q, these latter contact zones are generally indicated by the letter P, for obvious reasons of simplification. Thus one contact zone of the board 41 corresponds to each of the p contact zones of the block 26. The (p+1)th contact zone 43 of this board is intended for connection with the conductor track 52C of the block 26.

In FIG. IQ, this track 52C has not been shown, for the sake of simplicity. FIG. 1Q again shows that on its edge opposite that provided with the contact zones 43, the wiring board 41 is also provided with contact laminations 49, the purpose of which is to permit all of the electrical components 42 mounted on this board to be connected to a source of supply voltage or to other external electrical circuits (not shown) that are part of the control unit 11.

The set comprising the board 41 and the block 26 has been identified by reference numeral B-1 in FIG. 1Q. As can also be seen in this drawing figure, this set is placed inside a package including two rigid caps 44 and 45, which can be joined to one another by fixation elements such as screws 46. FIG. 1Q shows that these two caps are shaped such as to permit this set B-1 and another set B-2, similar to the set B-1, to occupy space inside the package obtained when the two caps 44 and 45 are affixed to one another. As will be described below, this arrangement makes it possible to obtain a transducer capable of forming magnetized zones on the recording carrier that are distributed at a spacing equal to one-half the spacing G (see FIG. 1A) by which the magnetic cores are distributed in the block 26.

When the set B-1 formed by the board 41 and the block 26 has been put into place in the package, then before the package is closed, the electrical connections between the p contact zones of this block and the p contact zones of this board, on the one hand, and between the conductor track 52C of this block and (p+1)th contact zone of the board, on the other hand, are effected, as shown in FIG. 1Q; all these connections are made by means of conductor wires 48. This operation can be performed either manually or, preferably, entirely automatically, with the aid of a suitable known type of wiring machine.

It should now be remembered that the magnetic heads incorporated inside the block 26, each of which comprises one magnetic core provided with one winding, are distributed by a spacing G, which in the example described equals 212 $\mu$m.

In the case where it is intended to obtain a magnetic transducer capable of forming punctuate magnetized zones distributed by a spacing of 106 m on the recording carrier, two similar sets B-1 and B-2, as shown in FIG. 1Q, will now be used, each comprising one block 26 and one wiring board 41, and they are placed face to face, as the drawing shows, but with the blocks 26 of these two sets positioned with respect to one another such that all the heads of one of the two blocks are offset by one-half spacing from all the heads of the other blocks. Once this placement has been completed, the two heads 44 and 45 are joined with th aid of the screws 46, to obtain a rigid module. This module then undergoes monitoring, to verify proper functioning of the electrical circuits that it includes. After that, it can be placed inside the information recording apparatus for which it is intended.

In the method that has just been described, the magnetic cores 17-1, 77-2, . . . , 17-p and their respective windings E1, E2, . . . , Ep are initially fixed onto a metal sheet 18, before being placed on the support plate 20. In a variant of this method, it is possible to dispense with the use of a metal sheet 18 and fix the cores and their windings directly to the support plate 20, which has previously been coated with a layer 19 of polymerizable resin. In that case, after the cores and their windings have been positioned on the support plate 20, the support plate is subjected to a curing operation, at a temperature capable of causing the polymerization of the resin. After that, using a molding resin, the voids that remain between the cores are filled, so that after hardening of this latter resin, a block is obtained that is similar in structure to that shown in FIG. 1E. However, it should be noted that in this variant of the method, the magnetic cores and their windings are not firmly held at the moment when they are positioned on the support plate 20. Since these cores have a coefficient of thermal expansion that is markedly greater than that of the material comprising the support plate 20, there is the risk that these cores may shift slightly with respect to one another when the support plate undergoes the aforementioned curing operation, so that under these conditions it is difficult to obtain a magnetic transducer in which the heads are parallel to one another and distributed by a constant spacing G. This is why the use of a metal sheet 18, made of a material having a coefficient of thermal expansion close to that of the material of which the magnetic cores are made, proves to be particularly advantageous in the method according to the present invention.

Figure 1X:
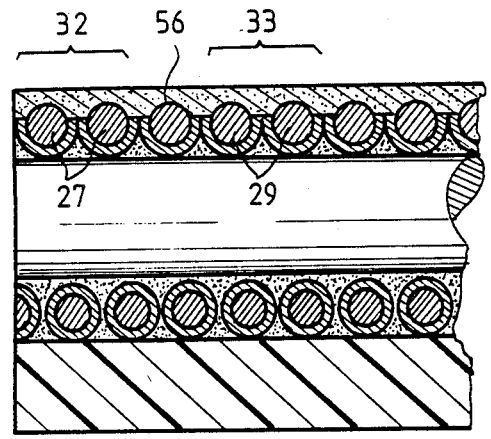
Figure 1Y:
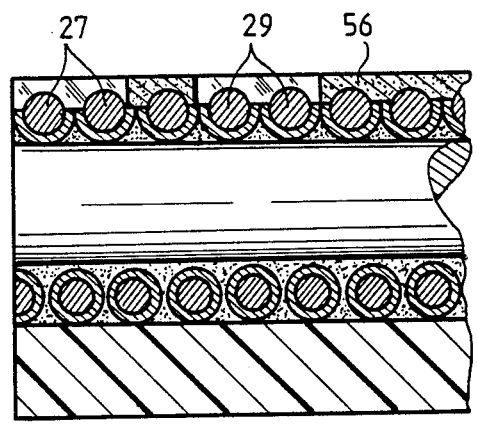

In another variant of the method of the invention, after the block 26 has been subjected to a reactive ionic etching operation intended to expose the upper portions 34 of the spirals (FIG. 1F), an operation of ultrasonic cleaning of the block is performed, and then, as FIG. 1X shows, a layer 56 of a polyimide resin containing photosensitive elements is deposited on the face of the block 26 where the portions of the thus-exposed spirals appear. This resin may for example be one of those industrially manufactured by duPont de Nemours under the name "PYRALIN PD", or by Ciba-Geigy under the name "PROBIMIDE". The deposition of this resin is performed under the same conditions as those described above for the deposition of the resin film 50, but with the difference that this deposition is now performed in the absence of any light source capable of causing a reaction on the part of the photosensitive elements contained in this resin. Additionally, the rotational speed of the plate whirler is adjusted in such a manner that the thickness of this resin layer 56 remains between 10 and 25 μm. When this deposition is completed, the resin is subjected to pre-curing for 30 minutes, at a temperature on the order of 120° C., so as to cause partial imidization of the resin. The next step is the insulation of the resin film 56 with a mask, and then the development of this layer; the mask used for this insulation is selected such that at the end of these operations, the resin film is eliminated from regions 32 and 33 of the layer, which as FIG. 1Y shows, are located facing the second and first groups of spirals, respectively, of each winding. Consequently, the upper portions of these first and second groups of spirals are exposed. After that, the portions of the resin layer 56 that remain are subjected to curing, at a temperature that causes the complete polymerization of this resin. Next, with a high-pressure corona discharge operation, complete cleaning of the remaining layer 56 and of the exposed portions of the first and second groups of spirals is performed. After that operation, a block 26 is obtained which is capable of being coated with a layer 52 of conductive metal. The method used to perform this coating, and all the operations performed after that, will not be described because they are similar to those described above with reference to Figs. 1K-1N, 1P and 1Q.

Figure 4B:
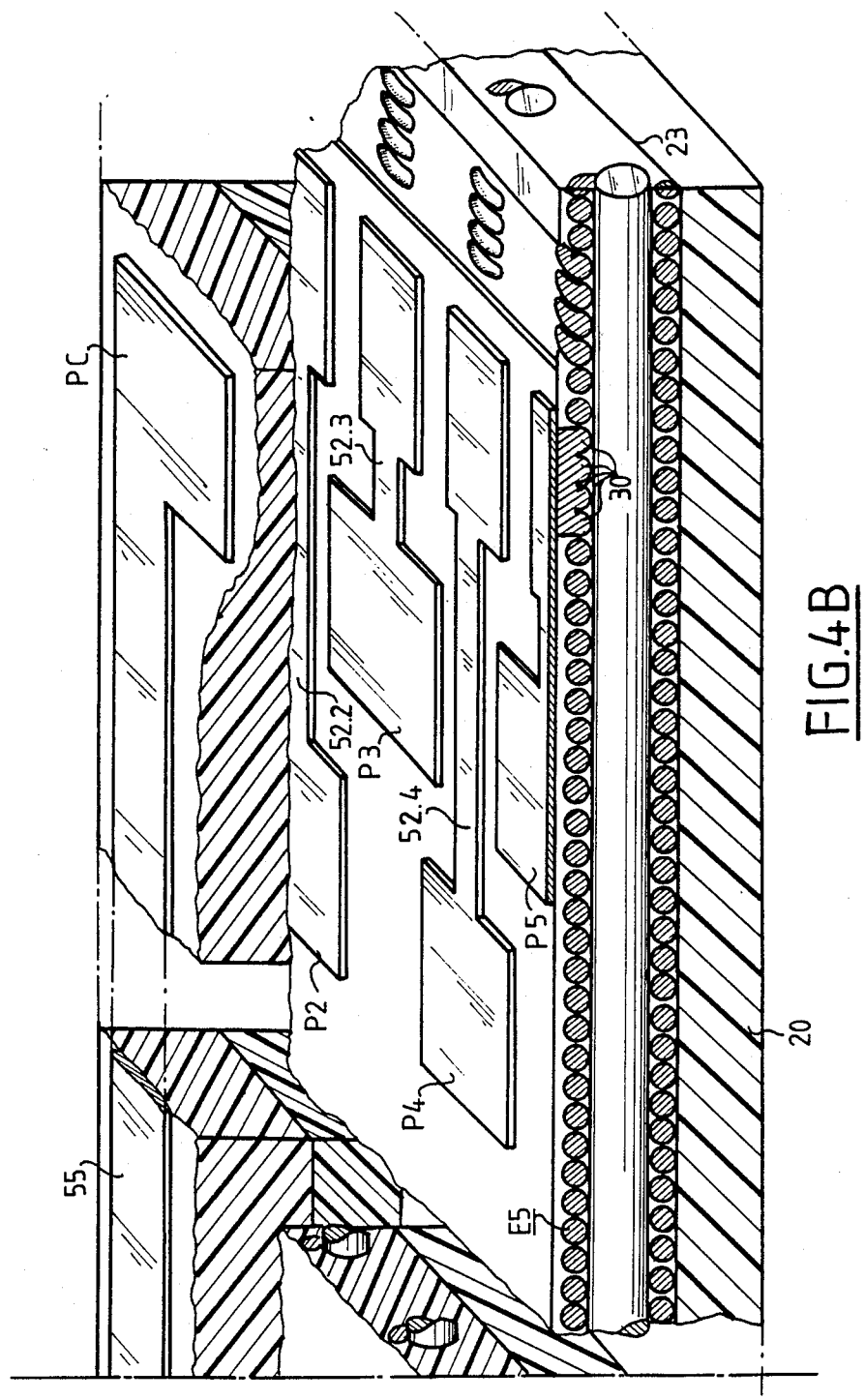

As described above, the mask used to insulate the photoresist film 53 in the method that has just been described has a configuration such that the conductor tracks and contact zones obtained by photoetching of the metal layer 52 are disposed in the manner indicated in FIGS. 3A and 3B. In this disposition, the conductor track 52 which is connected to the first groups of spirals 30 extends above these spirals, parallel to and in proximity with the face 23 of the block 26, and the contact zones P1, P2, P3, and so forth, which are formed in the vicinity of this track 52 are connected to the first groups of spirals 29 via the tracks 52-1, 52-2, 52-3, and so forth. However, it should be noted that this arrangement is not the only one possible in the invention, and that by using a suitable photoetching mask, a different disposition my be used, for instance that shown in FIGS. 4A and 4B, in which the p contact zones P1, P2, P3, and so forth, which are located at the same sites as those they occupy in FIGS. 3A and 3B, are no longer connected to the first groups of spirals 29 but to the first groups of spirals 30, with the consequence that the length of the tracks 52-1, 52-2, 52-3, and so forth is greatly reduced. In this disposition, the conductor track 52C which is connected to the first groups of spirals 29, extends above these spirals parallel to and in proximity with the other face 22 of the block 26. Since under these conditions this track 52C is relatively far from the face 23 against which the wiring board 41 intended to be connected to this block 26 must be attached, an additional contact zone PC has been formed next to the set of zones P1, P2, P3, and so forth; this zone PC, connected to the track 52C via a conductor strip 55, thus makes it possible to reduce the length of the jumper wire 48 necessary for assuring the connection of this track 52C to a corresponding contact zone of the wiring board.

It should also be noted that although a single conductor track 52 is provided in the configurations shown in FIGS. 3A, 3B, 4A and 4B, for assuring the return of the currents circulating in the various windings, another configuration could be obtained by using a suitable photoetching mask in which the return of these currents would be assured by a plurality of conductor tracks.

It will be understood that the invention is in no way limited to the exemplary embodiments described and shown herein. On the contrary, the invention encompasses any means comprising techniques equivalent to those described and shown herein, taken in isolation or in combination, and within the scope of the appended claims.

What is claimed is:

1. A method for producing a magnetic transducer adapted for the recording and/or reading of information on a magnetic carrier (12), the transducer including at least one row of p magnetic heads (T1, T2, T3, and so forth), each of these heads comprising an elongated magnetic core provided with an excitation winding, the method comprising forming winding (such as E1) of insulated conductor wire on each elongated magnetic core (such as 17-1) having a plurality of spirals, making at least one elementary block (26) by disposing p cores, each provided with a winding, on a support plate (20) having two opposed edges (22 and 23), in such a manner that these p cores are placed side by side, and embedding the set of these p cores in a layer (25) of hardenable insulating substance;

attacking the surface (31) of this layer, after hardening of said substance, to expose the upper portion (34) of all the spirals of each winding, but without causing modification in the cross section of the spirals;

spreading over each layer a film (50 or 56) of insulating resin to cover the thus-exposed portions of the spirals, except for upper portions of two first groups of spirals (29 and 30) located respectively in the vicinity of each of the two ends of each winding;

and forming on said resin film (50 or 56) contact zones (P1, P2, ..., Pp, 52C) connected to said first groups of spirals to permit the connection of said windings to a electrical control circuit.

2. A method for producing a magnetic transducer in accordance with claim 1, characterized in that the contact zones formed on the resin film (50 or 56) are made in such a manner as to comprise p contact zones (P1, P2, ..., Pp), on the one hand, each connected respectively to one of the two first groups spirals of each of the p windings, and on the other hand at least one contact zone (52C) connected to the other first group of spirals of each winding.

3. A method for producing a magnetic transducer as defined by claim 1, characterized in that with each winding extending over the entire length of the core about which it is wound, the method further comprises:
spreading the film of insulating resin in such a manner that said film also does not cover the upper portions, on each winding, of two second groups of spirals (27 and 28) located respectively in proximity with each of the ends of this winding, between this end and the first group of spirals (29 or 30) which is near this end;
and on each winding, eliminating said second groups of spirals (27 and 28).

4. A method for producing a magnetic transducer as defined by claim 2, characterized in that with each winding extending over the entire length of the core about which it is wound, the method further comprises:
spreading the film of insulating resin in such a manner that said film also does not cover the upper portions, on each winding, of two second groups of spirals (27 and 28) located respectively in proximity with each of the ends of this winding, between this end and the first group of spirals (29 or 30) which is near this end;
and on each winding, eliminating said second groups of spirals (27 and 28).

5. A method for producing a magnetic transducer as defined by claim 3, characterized in that it further comprises, after deposition of the film of insulating resin (50 or 56) but before elimination of the second groups of spirals, depositing on each film (50 or 56) and on the exposed spirals a metal layer (52) which permits these spirals to be connected to one another via an electrically conductive material.

6. A method for producing a magnetic transducer as defined by claim 4, characterized in that it further comprises, after deposition of the film of insulating resin (50 or 56) but before elimination of the second groups of spirals, depositing on each film (50 or 56) and on the exposed spirals a metal layer (52) which permits these spirals to be connected to one another via an electrically conductive material.

7. A method for producing a magnetic transducer as defined by claim 5, characterized in that the (p+1) contact zones (52C, P1, P2, ..., Pp) are obtained by photoetching of the metal layer (52), this etching being performed in such a manner as to permit one of the two (for example, 29) first groups of spirals of each winding to be connected respectively to one of the p contact zones (P1, P2, ..., Pp) thus formed, and to permit the other first group of spirals (for example, 30) of each winding to be connected to the (p+1)th contact zone (52C).

8. A method for producing a magnetic transducer as defined by claim 6, characterized in that the (p+1) contact zones (52C, P1, P2, ..., Pp) are obtained by photoetching of the metal layer (52), this etching being performed in such a manner as to permit one of the two (for example, 29) first groups of spirals of each winding to be connected respectively to one of th p contact zones (P1, P2, ..., Pp) thus formed, and to permit the other first group of spirals (for example, 30) of each winding to be connected to the (p+1)th contact zone (52C).

9. A method for producing a magnetic transducer as defined by claim 1, characterized in that it further comprises:
fixing each elementary block (26) to one edge of a board (41) equipped with a printed circuit and with components (42) belonging to the electrical control circuit (11), this printed circuit being formed so as to have contact zones (43) along said edge;
and connecting these contact zones (43) to the contact zones (P1, P2, ..., Pp, 52C) of said elementary block (26).

10. A method for producing a magnetic transducer as defined by claim 1, characterized in that th film (50 or 56) of insulating resin results from the polymerization of a polyimide resin, this polymerization being performed after the spreading of this resin over the layer (25) of insulating substance.

11. A method for producing a magnetic transducer as defined by claim 10, characterized in that the polyimide resin, when it is spread, covers the exposed portions of all the spirals and then, after having undergone partial imidization, is eliminated from the upper portions of the two first groups of spirals, this elimination being performed prior to the total polymerization of this resin.

12. A method for producing a magnetic transducer as defied by claim 1, characterized in that to obtain a positioning of the p cores on the support plate (20), the method comprises first fixing the p cores, provided with their windings and parallel to one another, onto a metal sheet(18), in such a manner that the cores are distributed at regular intervals on the sheet, then inverting the thus-obtained set and finally fixing it to the support plate (20) in such a manner that the p cores, which are thus inserted between the sheet (18) and the plate (20) extend between the two opposed edges (22 and 23) of this plate 13. A method for producing a magnetic transducer as defined by claim 12, characterized in that the embedding of the p cores in the hardenable insulating substance (25) is effected by injecting said substance between the support plate (20) and the metal sheet (18) by a technique of vacuum impregnation.

* * * * *

UNITED STATES PATENT AND TRADEMARK OFFICE
CERTIFICATE OF CORRECTION

PATENT NO. : 4,910,862
DATED : March 27, 1990
INVENTOR(S) : Jean-Pierre Messer

It is certified that error appears in the above-identified patent and that said Letters Patent is hereby corrected as shown below:

Abstract line 4 "scuh" should be --such--.

Claim 1, line 34, col. 14, between "forming" and "winding" insert --a--.

Claim 8, line 7, col. 16 "th" should be --the--.

Claim 10, line 24, col. 16 "th" should be --the--.

Claim 12, line 37, col. 16 "defied" should be --defined--.

Signed and Sealed this

Second Day of July, 1991

Attest:

*Attesting Officer*

HARRY F. MANBECK, JR.

*Commissioner of Patents and Trademarks*

UNITED STATES PATENT AND TRADEMARK OFFICE
CERTIFICATE OF CORRECTION

PATENT NO. : 4,910,862

DATED : March 20, 1990

INVENTOR(S) : Donald L. Woff et al.

It is certified that error appears in the above-identified patent and that said Letters Patent is hereby corrected as shown below:

Column 4, line 11, change "of" to --with--.

Column 4, line 12, change "with" to --of--.

Column 8, line 61, change "systemm" to --system--.

Column 9, line 12, delete "." (second occurrence).

Column 10, line 50, change "D1-CD5" to --D1-D5--.

Column 10, line 54, change "ND8" to --D8--.

Column 11, line 63, change "an" to --a--.

Column 13, line 9, change "as" to --of--.

Column 13, line 28, change "70" to --170--.

Column 15, line 4, after "properly chosen" insert --units--.

Column 15, line 4, change "nk1" to --n/k1--.

Column 15, line 17, change "denomination" to --denominator--.

Column 15, line 22, after "is" insert --to--.

Column 15, line 34, change "75'" to --75.--.

Column 15, line 66, delete "is" (first occurrence).

Column 20, line 27, change "nxt" to --next--.

UNITED STATES PATENT AND TRADEMARK OFFICE
CERTIFICATE OF CORRECTION

PATENT NO. : 4,910,862

DATED : March 20, 1990

INVENTOR(S) : Donald L. Woff et al.

It is certified that error appears in the above-identified patent and that said Letters Patent is hereby corrected as shown below:

Column 20, line 47, change "Thereafter" to --Therefore--.

Column 24, line 42, change "Therefore" to --Thereafter--.

Column 25, line 3, change "exist" to --exit--.

Column 27, line 66, change "IN" to --In--.

Column 28, line 6, change "acumulates" to --accumulates--.

Column 28, line 17, change "bypaasses" to --bypasses--.

Column 29, line 14, change "time-base" to --time base--.

Column 30, line 34, after "operation" delete the comma.

Signed and Sealed this

Twenty-fourth Day of September, 1991

Attest:

HARRY F. MANBECK, JR.

Attesting Officer     Commissioner of Patents and Trademarks